United States Patent Office 3,326,945
Patented June 20, 1967

3,326,945
SYNTHESIS OF 17α - HALOETHYNYL - 17β - HYDROXY-19-NOR-4,9-ANDROSTADIEN-3-ONES
Earl M. Chamberlin, Westfield, N.J., assignor to Merck & Co., Inc., Rahway, N.J., a corporation of New Jersey
No Drawing. Filed Mar. 23, 1965, Ser. No. 442,179
8 Claims. (Cl. 260—397.4)

This invention is concerned generally with novel steroid compounds and processes for preparing the same. More particularly, this invention relates to 3,17β-dihydroxy-19-nor-2,5(10),9(11)-androstatriene 3-ethers, 3-hydroxy-19-nor-2,5(10),9(11)-androstatriene-17-one 3-ethers, and 3,17β-dihydroxy - 17α - haloethynyl - 19 - nor - 2,5(10),9(11)-androstatriene 3-ethers; to novel processes for preparing these new compounds by starting with known 3-methoxy - 19 - nor - 1,3,5(10),9(11)-androstatetraene-17-one or other 3-hydroxy-19-nor-1,3,5(10),9(11) - androstatetraene-17-one 3-ethers prepared from known 3-hydroxy - 19 - nor-1,3,5(10),9(11)-androstatetraene-17-one by conventional etherification procedures such as treatment of a sodium or potassium salt of the 3-hydroxy-19-nor - 1,3,5(10),9(11)-androstatetraene-17-one with an alkyl iodide or by alkanolysis of 3-hydroxy-19-nor-1,3,5 (10,9(11)-androstatetraene-17-one paratoluene sulfonate, and to a novel process for preparing 17α-haloethynyl-17β-hydroxy-19-nor-4,9-androstadiene-3-one compounds from 3 - hydroxy - 17α-haloethynyl-17β-hydroxy-19-nor-2,5 (10),9(11)-androstatriene 3-ethers. The novel 3,17β-dihydroxy - 19 - nor-2,5(10),9(11)-androstatriene 3-ethers, 3-hydroxy - 19 - nor-2,5(10),9(11)-androstatriene-17-one 3-ethers, and 3,17β-dihydroxy-17α-haloethynyl-19-nor-2, 5(10),9(11)-androstatriene 3-ethers of this invention are useful as intermediates in the preparation of 17α-haloethynyl - 17β - hydroxy-19-nor-4,9-androstadiene-17-one compounds which possess useful therapeutic properties as orally and parentally active progestational agents.

The novel, 3,17β-dihydroxy-19-nor-2,5(10),9(11)-androstatriene 3-ethers, 3-hydroxy-19-nor-2,5(10),9(11)-androstatriene-17-one 3-ethers, and 3,17β-dihydroxy-17α-haloethynyl - 19 - nor - 2,5(10),9(11)-androstatriene 3-ethers may be chemically represented as follows:

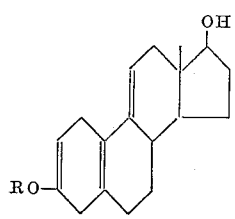

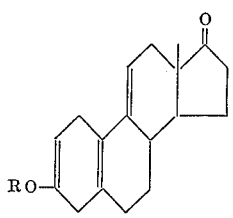

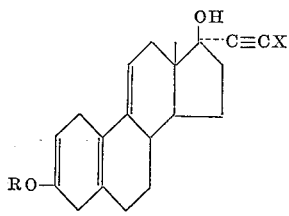

wherein X is a chlorine or bromine atom, and R is a hydrocarbon or substituted hydrocarbon radical such as an aliphatic or substituted aliphatic radical, more particularly, an alkyl radical such as methyl, ethyl, butyl, amyl; or a cycloaliphatic or cycloalkyl radical such as cyclopentyl, cyclohexyl, and the like.

The 3,17β - dihydroxy-19-nor-2,5(10),9(11)-androstatriene 3-ethers, 3-hydroxy-19-nor-2,5(10),9(11)-androstatriene-17-one 3-ethers, and 3,17β-dihydroxy-17α-haloethynyl - 19 - nor-2,5(10),9(11)-androstatriene 3-ethers are prepared in accordance with the novel processes of this invention, starting with a 3-hydroxy-19-nor-1,3,5(10), 9(11)-androstatetraene-17-one 3-ether which has the following structural formula:

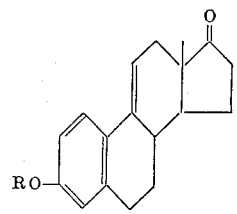

in which R has the same significance as above.

3,17β - dihydroxy - 19-nor-2,5(10),9(11)-androstatriene 3-ethers are prepared by reduction of 3-hydroxy-19-nor - 1,3,5(10),9(11) - androstatetraene-17-one 3-ethers with sodium in liquid ammonia. In carrying out the reduction, a solution of a 3-hydroxy-19-nor-1,3,5(10),9(11)-androstatetraene-17-one 3-ether in an organic solvents, such as a mixture of ether and tetrahydrofuran or dioxane, is added to liquid ammonia, and metallic sodium is then added slowly to the solution containing liquid ammonia. The reaction mixture is maintained at a temperature between about −35° to −40° C. during the time the metallic sodium is being added and after addition is complete until all of the metallic sodium is reacted and consumed. Dry methanol is then added to the reaction mixture in an amount sufficient to react with any unreacted metallic sodium. Dry nitrogen gas is passed through the reaction mixture until all of the ammonia is removed and during this period, the reaction mixture is allowed to come to −5° C. After all the ammonia is removed, distilled water is added with stirring and chloroform is then added. The chloroform layer is removed and washed with water. The chloroform is removed by distillation at reduced pressure and additional water is added to the residue. The reaction product is formed as a precipitate and is removed by filtration and washed with oxygen-free water. The precipitate is a 3,17β-dihydroxy-19-nor-2,5 (10),9(11)-androstatriene 3-ether.

3,17β - dihydroxy-nor-2,5(10),9(11)-androstatriene 3-ether is converted to 3-hydroxy-19-nor-2,5(10),9(11)-androstatriene-17-one 3-ether by oxidation with an aluminum alkoxide, such as aluminum isopropoxide or aluminum tertiary-butoxide, in an organic solvent, such as toluene or xylene, in the presence of a ketone, such as an aliphatic ketone or a cycloaliphatic ketone, more particularly acetone, methyl ethyl ketone, or cyclohexanone. The solution of 3,17β - dihydroxy-19-nor-2,5(10),9(11)-androstatriene 3-ether and aluminum alkoxide in a dry ketone solvent and a dry hydrocarbon solvent is refluxed under a nitrogen blanket for several hours. Ether and water are then added to the cooled reaction mixture and the organic layer is separated. The aqueous layer is extracted with ether and combined with the organic layer. The combined ether solution is dried and concentrated under reduced pressure to remove all solvent. The residue is a 3-hydroxy-19-nor-2,5(10),9(11)-androstatriene-17-one 3-ether.

3 - hydroxy - 19 - nor - 2,5(10),9(11) - androstatriene-17-one 3-ether is converted to a 3,17β-dihydroxy-17α-haloethynyl-19-nor-2,5(10),9(11) - androstatriene 3 - ether by treatment with a haloethyne, such as bromo- or chloroethyne in an organic solvent. In a preferred embodiment, the haloethyne is formed in situ by the reaction of a 1,2-dihaloethylene (preferably in cis form) and methyl lithium. For example, chloroethyne is prepared by adding a solution of cis-1,2-dichloroethylene in ether to a solution of methyl lithium at 0° C. in ether and allowing the reaction mixture to stand at about 20° C. for about two hours. A 3-hydroxy-19-nor-2,5(10),9(11)-androstatriene-17-one 3-ether in solution in an organic solvent, such as tetrahydrofuran, is slowly added to the solution containing haloethyne and the temperature is allowed to rise to about 30° C. during the addition. The reaction mixture is allowed to stand for about two hours and then poured into cold water. The resulting solution is extracted with a hydrocarbon solvent, such as benzene or xylene, and the solution in the hydrocarbon solvent is washed with water and dried. The hydrocarbon solvent is removed by evaporation under reduced pressure. The residue is a 3,17β-dihydroxy - 17α - haloethynyl - 19 - nor - 2,5(10),9(11)-androstatriene 3-ether.

17β - hydroxy - 17α - haloethynyl - 19 - nor - 4,9 - androstadiene-3-one is prepared by treating a solution of a 3,17β - dihydroxy - 17α - haloethynyl - 19 - nor - 2,5(10),9(11)-androstatriene 3-ether in an organic solvent, such as an aliphatic alcohol, i.e., ethanol, propanol, or tertiary butanol, and water with a strong acid, such as hydrochloric acid or sulfuric acid at room temperature. The reaction mixture containing the strong acid is stirred, allowed to stand for several hours, diluted with ice water, and extracted with a solvent such, as methylene chloride or ether. The extracts are washed with water, saturated sodium bicarbonate solution, and finally with water. The resulting solution is concentrated under reduced pressure and upon standing at low temperature, a precipitate of 17α-haloethynyl-17β-hydroxy-19-nor-4,9-androstadiene - 3 - one is formed.

The following examples illustrate methods of carrying out the present invention but it is to be understood that these examples are given by way of illustration and not of limitation.

EXAMPLE 1

*Preparation of 3-methoxy-17β-hydroxy-19-nor-2,5(10), 9(11)-androstatriene*

A solution of 49.2 g. of 3-methoxy-19-nor-1,3,5(10),9(11)-androstatetraene-17-one in 1000 ml. of ether and 1000 ml. of dioxane is added with stirring over a period of 30 minutes to 2000 ml. of liquid ammonia. 69 g. of sodium are added to the liquid ammonia solution over a period of one hour during which time the temperature of the solution is maintained at −35° to −40° C. The temperature is maintained within the same range until the metallic sodium is all in solution and then 200 ml. of dry methanol are slowly added to the reaction mixture. The temperature of the reaction mixture is maintained at −35° to −40° C. for one hour and then dry nitrogen gas is passed through the reaction mixture until all ammonia is removed and during this period the temperature of the reaction mixture is allowed to come to −5° C. 500 ml. of distilled water are then added to the reaction mixture with good stirring and then 750 ml. of chloroform are added. The chloroform layer is removed and washed with water and the chloroform is removed by distillation under reduced pressure and 1250 ml. of water is added to the residue. The resulting mixture is cooled to 20° C. and filtered to remove the product which is present as a solid. The product is washed with oxygen-free water. 45 g. of 3 - methoxy - 17β - hydroxy - 19 - nor - 2,5(10),9(11)-androstatriene are obtained.

EXAMPLE 2

*Preparation of 3-methoxy-19-nor-2,5(10),9(11)-androstatriene-17-one*

A mixture of 24.6 g. of 3-methoxy-17β-hydroxy-19-nor-2,5(10),9(11)-androstatriene and 3.1 g. of aluminum isopropoxide in 18 ml. of dry acetone and 80 ml. of dry toluene is refluxed under nitrogen for 6 hours. 80 ml. of ether and 80 ml. of water are successively added to the cooled reaction mixture and the ether layer is removed. The aqueous layer is extracted three times with 80 ml. portions of ether. The ether extracts are combined with the ether solution and the resulting solution is dried over magnesium sulfate. The ether is removed from the dried solution at reduced pressure under nitrogen. The residue is triturated with petroleum ether and filtered. 23.23 g. of crystalline 3 - methoxy-19-nor-2,5(10),9(11)-androstatriene-17-one are obtained.

EXAMPLE 3

*Preparation of 3-methoxy-17α-chloroethynyl-17β-hydroxy-19-nor-2,5(10),9(11)-androstatriene*

99.6 g. of 3 - methoxy - 19 - nor - 2,5(10),9(11)-androstatriene-17-one in solution in 1000 ml. of tetrahydrofuran are added to a solution which is prepared by adding 170 g. of cis-dichloroethylene in 1400 ml. of ether during a period of 60 minutes to 1100 ml. of 1.3 N methyl lithium in ether at a temperature within the range of −5° to 0° C. under nitrogen followed by aging of the mixture for two hours at 20° C. The temperature of the reaction mixture rises to 30° C. during the addition of the 3-methoxy - 19 - nor - 2,5(10),9(11)-androstatriene-17-one to the solution containing cis-dichloroethylene and methyl lithium. The reaction mixture is aged for two hours and poured into 4 liters of water. This mixture is extracted twice with one liter portions of benzene and the benzene extract is washed with water. The benzene is distilled off under reduced pressure. The residue is 92 g. of 3-methoxy-17α - chloroethynyl - 17β - hydroxy - 19 - nor - 2,5(10),9(11)-androstatriene.

EXAMPLE 4

*Preparation of 17α-chloroethynyl-17β-hydroxy-19-nor-4,9-androstadiene-3-one*

The 92 g. of 3-methoxy-17α-chloroethynyl-17β-hydroxy-19-nor-2,5(10),9(11)-androstatriene is dissolved in 3300 ml. of ethanol and 1200 ml. of water. 700 ml. of concentrated hydrochloric acid is added to the aqueous ethanol solution and the homogenous mixture which results is stirred for 24 hours at room temperature. The reaction mixture is diluted with ice water and the diluted mixture is extracted twice with four-liter portions of methylene chloride and then with one liter of ether. The methylene chloride extracts are combined and washed twice with two one-liter portions of water and with one liter of saturated bicarbonate solution, and finally washed with two liters of water. The methylene chloride solution is dried over sodium sulfate and concentrated under reduced pressure to a volume of 300 ml. 500 ml. of anhydrous ether are added to the concentrated solution and the resulting mixture is concentrated under reduced pressure to a volume of 200 ml. 500 ml. of ether are then added to the concentrated solution and the resulting mixture is concentrated under reduced pressure to a volume of 300 ml. The concentrated solution is stored for 12 hours at 0° C. and the product which precipitates is removed by filtration and washed four times with 250 ml. portions of an ether-petroleum solvent comprising three volumes of ether for seven volumes of petroleum ether. The washed product is dried under reduced pressure, 89 g. of 17α-chloroethynyl-17β-hydroxy-19-nor-4,9-androstadiene-3-one are obtained.

EXAMPLE 5

Preparation of 3-cyclohexyloxy-17β-hydroxy-19-nor-2,5(10),9(11)-androstatriene

A solution of 64.9 g. of 3-cyclohexyloxy-19-nor-1,3,5(10),9(11)-androstatetraene-17-one in 1000 ml. of ether and 1000 ml. of dioxane is added with stirring over a period of 30 minutes to 2000 ml. of liquid ammonia. 69 g. of sodium are added to the liquid ammonia solution over a period of one hour during which time the temperature of the solution is maintained at —35° to —40° C. The temperature is maintained within the same range until the metallic sodium is all in solution and then 200 ml. of dry methanol are slowly added to the reaction mixture. The temperature of the reaction mixture is maintained at —35° to —40° C. for one hour and then dry nitrogen gas is passed through the reaction mixture until all ammonia is removed and during this period the temperature of the reaction mixture is allowed to come to —5° C. 500 ml. of distilled water are then added to the reaction mixture with good stirring and then 750 ml. of chloroform are added. The chloroform layer is removed and washed and the chloroform is removed by distillation under reduced pressure and 1250 ml. of water is added to the residue. The resulting mixture is cooled to 20° C. and filtered to remove the product which is present as a solid. The product is washed with oxygen-free water. 58.5 g. of 3-cyclohexyloxy-17β-hydroxy-19-nor-2,5(10),9(11)-androstatriene are obtained.

EXAMPLE 6

Preparation of 3-cyclohexyloxy-19-nor-2,5(10),9(11)-androstatriene-17-one

A mixture of 32.5 g. of 3-cyclohexyloxy-17β-hydroxy-19-nor-2,5(10),9(11)-androstatriene and 3.1 g. of aluminum isopropoxide in 18 ml. of dry acetone and 80 ml. of dry toluene is refluxed under nitrogen for six hours. 80 ml. of ether and 80 ml. of water are successively added to the cooled reaction mixture and the ether layer is removed. The aqueous layer is extracted three times with 80 ml. portions of ether. The ether extracts are combined with the ether solution and the resulting solution is dried over magnesium sulfate. The ether is removed from the dried solution at reduced pressure under nitrogen. The residue is triturated with petroleum ether and filtered. 30.6 g. of crystalline 3-cyclohexyloxy-19-nor-2,5(10),9(11)-androstatriene-17-one are obtained.

EXAMPLE 7

Preparation of 3-cyclohexyloxy-17α-chloroethynyl-17β-hydroxy-19-nor-2,5(10),9(11)-androstatriene

131.5 g. of 3-cyclohexyloxy-19-nor-2,5(10),9(11)-androstatriene-17-one in solution in 1000 ml. of tetrahydrofuran are added to a solution which is prepared by adding 170 g. of cis-dichloroethylene in 1400 ml. of ether during a period of 60 minutes to 1100 ml. of 1.3 N methyl lithium in ether at a temperature within the range of —5 to 0° C. under nitrogen followed by aging of the mixture for two hours at 20° C. The temperature of the reaction mixture rises to 30° C. during the addition of the 3-cyclohexyloxy-19-nor-2,5(10),9(11)-androstatriene-17-one to the solution containing cis-dichloroethylene and methyl lithium. The reaction mixture is aged for two hours and poured into four liters of water. The mixture is extracted twice with one liter portions of benzene and the benzene extract is washed with water. The benzene is distilled off under reduced pressure. The residue is 124.4 g. of 3-cyclohexyloxy-17α-chloroethynyl-17β-hydroxy-19-nor-2,5(10),9(11)-androstatriene.

EXAMPLE 8

Preparation of 17α-chloroethynyl-17β-hydroxy-19-nor-4,9-androstadiene-3-one

124.4 g. of 3-cyclohexyloxy-17α-chloroethynyl-17β-hydroxy-19 nor-2,5(10),9(11)-androstatriene is dissolved in 3300 ml. of ethanol and 1200 ml. of water. 700 ml. of concentrated hydrochloric acid is added to the aqueous ethanol solution and the homogenous mixture which results is stirred for 24 hours at room temperature. The reaction mixture is diluted with ice water and the diluted mixture is extracted twice with four-liter portions of methylene chloride and then with one liter of ether. The methylene chloride extracts are combined and washed twice with two-liter portions of water and with one liter of saturated bicarbonate solution, and finally washed with two liters of water. The methylene chloride solution is dried over sodium sulfate and concentrated under reduced pressure to a volume of 300 ml. 500 ml. of anhydrous ether are added to the concentrated solution and the resulting mixture is concentrated under reduced pressure to a volume of 200 ml. 500 ml. of ether are then added to the concentrated solution and the resulting mixture is concentrated under reduced pressure to a volume of 300 ml. The concentrated solution is stored for 12 hours at 0° C. and the product which precipitates is removed by filtration and washed four times with 250 ml. portions of an ether-petroleum ether solvent comprising three volumes of ether for seven volumes of petroleum ether. The washed product is dried under reduced pressure. 117.5 g. of 17α-chloroethynyl-17β-hydroxy-19-nor-4,9-androstadiene-3-one are obtained.

Various changes and modifications may be made in carrying out the present invention without departing from the spirit and scope thereof. Insofar as these changes and modifications are within the purview of the annexed claims, they are considered to be part of the invention.

What is claimed is:

1. A compound selected from the group which consists of 3-loweralkyl ethers and 3-cycloalkyl ethers of 3,17β-dihydroxy-19-nor-2,5(10),9(11)-androstatriene.

2. 3 - methoxy-17β-hydroxy-19-nor-2,5(10),9(11)-androstatriene.

3. A compound selected from the group which consists of 3-loweralkyl ethers and 3-cycloalkyl ethers of 3-hydroxy-19-nor-2,5(10),9(11)-androstatriene-17-one.

4. 3 - methoxy - 19-nor-2,5(10),9(11)-androstatriene-17-one.

5. A compound selected from the group which consists of 3-loweralkyl ethers and 3-cycloalkyl ethers of 3,17β - dihydroxy-17α-haloethynyl-19-nor-2,5(10),9(11)-androstatriene.

6. 3 - methoxy - 17β - hydroxy-17α-chloroethynyl-19-nor-2,5 (10),9(11)-androstatriene.

7. Process for the preparation of 17β-hydroxy-17α-haloethynyl - 19-nor-4,9-androstadiene-3-one which comprises the steps of reacting a solution of a 3-hydroxy-19 - nor-1,3,5(10),9(11)-androstatetraene-17-one 3-ether in an organic solvent with sodium in liquid ammonia to provide a 3,17β-dihydroxy-19-nor-2,5(10),9(11)-androstatriene 3-ether, reacting a solution of the 3,17β-dihydroxy - 19-nor-2,5(10),9(11)-androstatriene 3-ether in an organic solvent containing a ketone with an aluminum alkoxide to provide a 3-hydroxy-19-nor-2,5(10),9(11)-androstatriene-17-one 3-ether, reacting a solution of the 3 - hydroxy - 19-nor-2,5(10),9(11)-androstatriene-17-one 3-ether in an organic solvent with a haloethyne to provide a 3,17β - dihydroxy-17α-haloethynyl-19-nor-2,5(10), 9(11)-androstatriene 3-ether, and reacting a solution of the 3,17β - dihydroxy - 17α-haloethynyl-19-nor-2,5(10), 9(11)-androstatriene 3-ether in an organic solvent with a strong acid.

8. Process for the preparation of 17β-hydroxy-17α-chloroethnyl - 19 - nor - 4,9 - androstadiene-3-one which comprises the steps of reacting a solution of 3-methoxy-19 - nor-1,3,5(10),9(11)-androstatetraene-17-one in an organic solvent with sodium in liquid ammonia to provide 3 - methoxy-17β-hydroxy-19-nor-2,5(10),9(11)-androstatriene, reacting a solution of the 3-methoxy-17β-hydroxy-19-nor-2,5(10),9(11)-androstatriene in an organic solvent containing a ketone with aluminum isopropoxide to provide 3 - methoxy-19-nor-2,5(10),9(11)-androstatriene-17-one, reacting a solution of the 3-methoxy-19-nor-2,5(10),9(11) - androstatriene-17-one in an organic solvent with chloroethyne to provide 3-methoxy-17β-hydroxy - 17α - chloroethynyl-19-nor-2,5(10),9(11)-androstatriene, and reacting a solution of the 3-methoxy-17β-hydroxy - 17α - chloroethynyl-19-nor-2,5(10),9(11)-androstatriene in an organic solvent with hydrochloric acid.

References Cited

UNITED STATES PATENTS

| 2,759,951 | 8/1956 | Djerassi et al. | 260—397.3 |
| 3,202,684 | 8/1965 | Burn et al. | 260—397.5 |
| 3,234,244 | 2/1966 | Cross | 260—397.45 |

OTHER REFERENCES

Smith et al.: Jour. Chem. Soc., pp. 4472–4492, November 1964, p. 4487 relied on.

LEWIS GOTTS, *Primary Examiner.*

HENRY A. FRENCH, *Assistant Examiner.*